Figure 1:
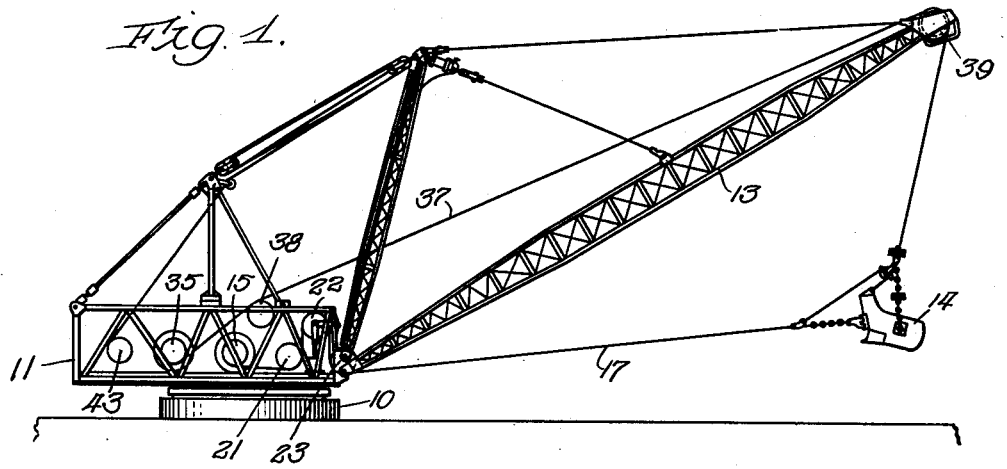

April 7, 1953

J. W. PAGE 2,633,649

DRAGLINE BUCKET AND BOOM CONTROL

Filed Feb. 28, 1947

2 SHEETS—SHEET 1

Inventor:
John W. Page,
By Christian, Schroeder, Merriam & Halgren,
Attys.

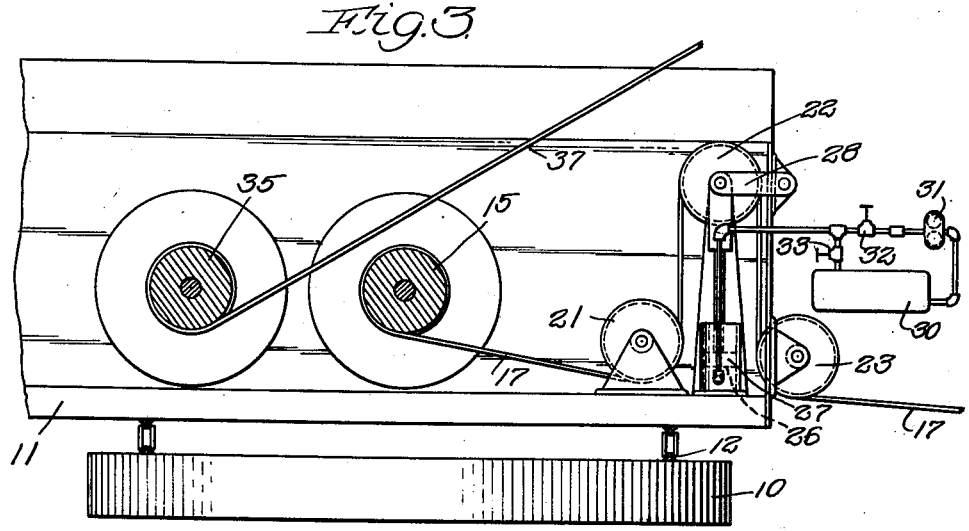
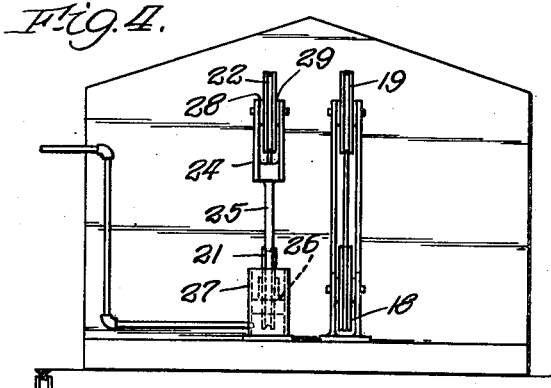
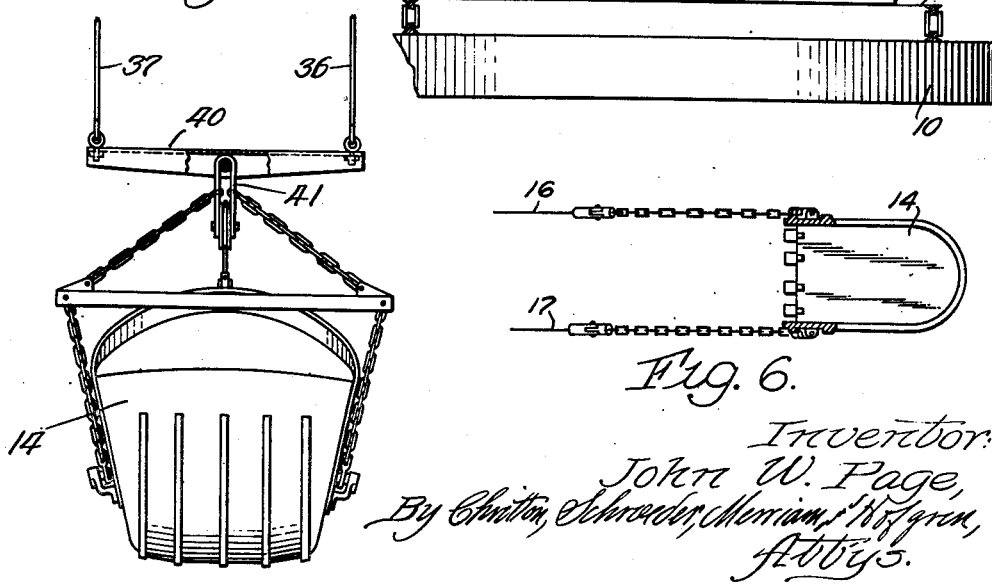

Patented Apr. 7, 1953

2,633,649

UNITED STATES PATENT OFFICE 2,633,649

DRAGLINE BUCKET AND BOOM CONTROL

John W. Page, Chicago, Ill., assignor to Page Engineering Company, a corporation of Illinois Application February 28, 1947, Serial No. 731,478

2 Claims. (Cl. 37—116)

This invention relates to load handling apparatus, particularly for dragline excavators, and to the use of a plurality of cables in place of a single cable, as for loading and hoisting the bucket.

In handling heavy loads with cables, as for example in dragline excavators where large sized buckets of the order of 25 to 35 cubic yards are being handled, the use of single lines or cables for loading and hoisting requires such large diameter cables (three inches or more in diameter) that the cable becomes unwieldy, and will not bend easily around a relatively small diameter drum or a sheave of ordinary size. In an effort to overcome this difficulty some dragline excavators have employed two load cables, enabling a cable of about two inch diameter to be used. This has heretofore proved to have many practical disadvantages, however.

Cables inherently have a certain amount of stretch or give, and this varies in accordance with the length of use of the cable, new cables having a much greater amount of stretch than older ones. When the cable of a twin line excavator breaks and is replaced by a new cable therefor, a great deal of difficulty is experienced in keeping the pull on the two cables properly equalized. Under present conditions the operator must stop excavating and go through a long and laborious job of disconnecting the cable at one end or the other and shortening it and reconnecting it as necessary, this operation being repeated at relatively frequent intervals until the new cable is "broken in." About this time it always seems as though the other cable breaks, and the operator is then going through the same troubles on the other side.

I have devised and am here disclosing and claiming a power actuated arrangement for varying the relative lengths of the cables which requires no effort by the operator and may be done at any time in a matter of seconds, even while the load is being pulled in. The result is that a new cable can be installed on a twin line excavator and the machine operated continuously without any shutdowns whatsoever for load line adjustment.

Moreover, the finger tip control of the operator over the relative length of the load cables is of considerable advantage in digging, as during the process of digging in and filling the bucket, the same can, to some extent, be guided by changing the relative lengths of the load lines to cause the bucket to dig strongly to one side or the other at the control of the operator.

In addition, I have provided a twin line arrangement for hoisting, with an automatic equalizing arrangement compensating for any differences in the initial connection or stretching of the hoist lines, no control of the operator over the relative length of these lines being provided since there is no need of controlling the direction or character of movement of the bucket during hoisting.

Figure 2:
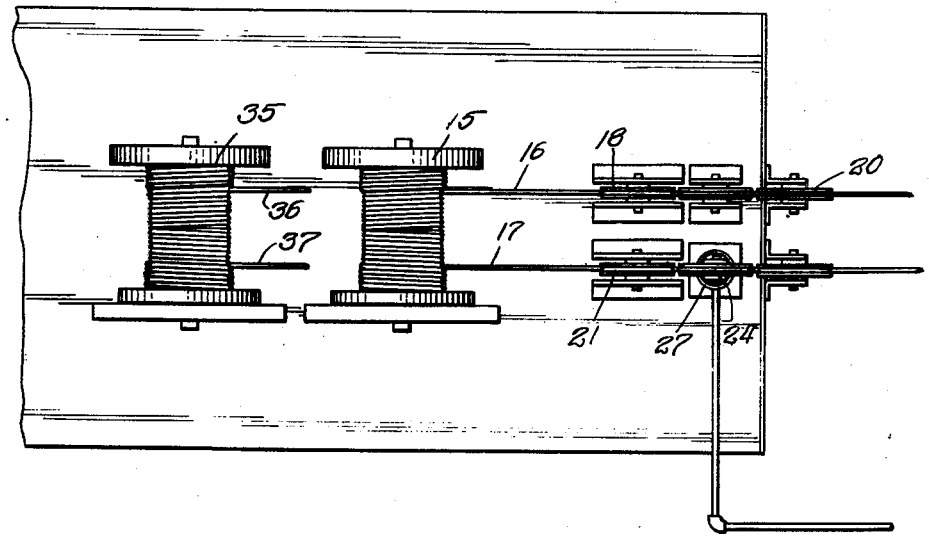

Various other features and advantages of my invention will be apparent from the following specification and the drawings, in which:

Figure 1 is a side elevational view of one form of dragline excavator embodying my inventions; Figure 2 is a fragmentary plan view of the deck of the excavator shown in Figure 1; Figure 3 is a fragmentary enlarged side elevational view of the portion of the excavator shown in Figure 2; Figure 4 is a fragmentary front view, looking from the right of Figure 2; Figure 5 is a back elevational view of a bucket and hoist equalizing arrangement; and Figure 6 is a plan view, with a portion broken away, of the bucket of the excavator shown in Figure 1.

Various types of dragline excavators and the particular buckets which I prefer to use therewith have been shown in a number of my earlier patents, and, therefore, will not be described in detail here. The general structure of the particular excavator illustrated is similar to that shown in my Patent No. 2,255,568; and the bucket is of the type in Reissue Patent No. 21,664, sometimes known as the Page automatic bucket. Since reference may be had to these and others of my earlier patents to supplement the description, the general operation of the particular type of load handling apparatus illustrated here will be only briefly described.

A dragline excavator of the particular type illustrated here is provided with a base or tub 10 having a body 11 rotatable thereon on a suitable circular track 12. A main boom 13 is pivotally mounted at the front of the excavator body and suitable overhead structure and cables are provided for moving the boom to and holding it at any desired position, boom elevations being controlled by the rearmost power driven drum 43. Suitable means, in the form of drums power driven by diesel, electric or other motors, and hoist and load lines, are provided to handle the bucket 14, and it is with the provision of a plurality of lines (twin lines are here shown) for hoisting and loading or dragging that we are here concerned.

Referring more particularly to Figures 2, 3 and 4, the load drum 15 is driven by conventional means (not illustrated) so that rotation thereof causes winding thereon or therefrom of the load lines or cables 16 and 17, control of drum operation being by conventional clutch and brake arrangements more particularly illustrated in other of my patents. In the particular embodiment illustrated the cables 16 and 17 are connected near the outer ends of the drum and wound in toward the center thereof. The cable 16 passes over a lower stationary sheave or guide member 18 fixedly mounted on the deck, an upper fixedly mounted sheave or guide member 19, and another lower and forward sheave 20, this latter also being fixedly mounted, the line then moving to the bucket 14, to which it connects at one side by one bridle chain. The other cable 17 passes over a sheave 21 fixedly mounted on the deck of the excavator body 11, then over a movably mounted sheave or guide member 22, then down around another lower and forward fixedly mounted sheave 23.

As may be best seen in Figure 4, the movably mounted sheave 22 is carried by a yoke 24 mounted on the piston rod 25 connected to a piston 26 in the cylinder 27, the position of the yoke being stabilized by lever arms or links 28 and 29 pivotally connected to one of the front structural members of the body of the excavator.

Power actuated means is provided for moving the adjustable or movable sheave 22 in a direction substantially entirely transverse to the normal line of pull of the load line 17. It will be understood that this apparatus, or at least the controls therefor, are located in the operator's cab conveniently at his control, although they are shown in Figure 3 in schematic form. They are here shown as consisting of a special tank 30 for oil or similar hydraulic actuating fluid, a power driven pump 31, and valves 32 and 33 for controlling the admission of fluid to and exhausting it from the lower part of the cylinder 27 beneath the piston 26.

In installing one or both load lines, the cables would be so connected as to be substantially uniform in length when the movable sheave 22 was at the intermediate position as shown in the drawing. Thereafter, at any time it may be desirable to shorten the line 17 relative to the line 16, the valve 32 may be opened to admit fluid below the piston 26 and cause the sheave 22 to rise, this effectively shortening the line 17 relative to its companion line. Similarly, if it is desired to lengthen the line 17 relative to the line 16 because of greater stretching of the line 16 or for any other reason, the valve 33 may be opened to exhaust fluid from beneath the piston 26 and lower the sheave 22 until the desired relationship between the lines is achieved. It will be understood that, if desired, both cables may be provided with movable adjacent guide member arrangements to enable a greater relative change in the length of the cables.

As will be readily apparent, this convenient power actuated arrangement for changing the relative length of the cables without disturbing other connections to the drum or to the bucket enables equalizing adjustments to be made without the operator leaving the cab, and while some other operation is being performed if desired. Moreover, in addition to enabling equalization of the cables despite differences in stretch, my arrangement enables the operator to have greater control of the bucket during digging, as he can to some extent determine the direction of dig and make the bucket tend to dig to the right or left at will.

I also prefer, in connection with the larger buckets, to provide a twin hoist line arrangement. In the particular embodiment of my invention illustrated herewith a hoist drum 35 is provided with twin hoist lines 36 and 37 which extend over twin guide sheaves 38 and twin sheaves 39 at the end of the boom down to the ends of an equalizer member or beam 40 just above the bucket 14. The various chains and lines supporting the bucket for hoisting are rigged in conventional manner and brought together to a single yoke member 41, this yoke member in this case being pivotally connected to the center of the equalizer beam 40. Differences in the relative length of the hoist cables 36 and 37 will be compensated for by this automatic equalizing arrangement, since even if the beam 40 is at an angle in one direction or the other, the bucket, supported from its center, still hoists as though handled by a single line.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a dragline bucket excavator, bucket hauling apparatus of the character described, including: a pair of cables attached to the bucket, one at each side thereof; power driven drum means on which the cables wind for simultaneously moving the cables to move the bucket; a guide member over which one of the cables passes; a movable mounting for said guide member, at least a component of the movement of said guide member being in a direction transverse to the line of pull of the cable in contact therewith; and manually controlled power operated means for moving said guide member to and maintaining it at a predetermined position to adjust the effective length of the cable passing over said guide member.

2. In a dragline bucket excavator, hauling apparatus for handling the bucket, including: a pair of load cables attached to the bucket, one at each side thereof; a single driven drum means on which both of the cables wind for simultaneously moving the cables to move the bucket; a pair of guide members, one of the cables passing over each of the guide members; a movable mounting for one of said guide members, at least a component of the movement of said guide member being in a direction transverse to the line of pull of the cable in contact therewith; and manually controlled power operated means for moving said guide member to and maintaining it at a predetermined position to adjust the effective length of the cable passing over the last mentioned guide member.

JOHN W. PAGE.

REFERENCES CITED

The following references are of record in the file of this patent:

UNITED STATES PATENTS

| Number | Name | Date |
| --- | --- | --- |
| 1,311,108 | Beckwith | July 22, 1919 |
| 2,070,153 | Brown | Feb. 9, 1937 |
| 2,330,113 | Daniels | Sept. 21, 1943 |
| 2,341,838 | Bager | Feb. 15, 1944 |